UNITED STATES PATENT OFFICE.

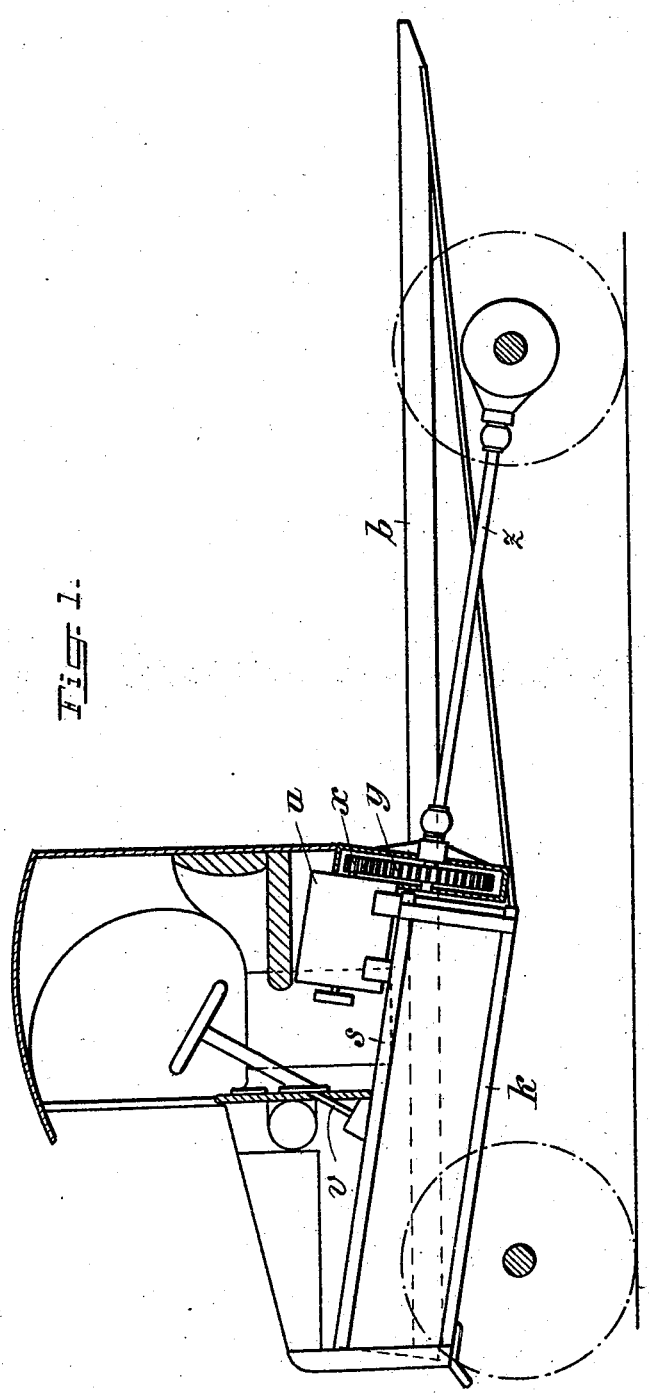

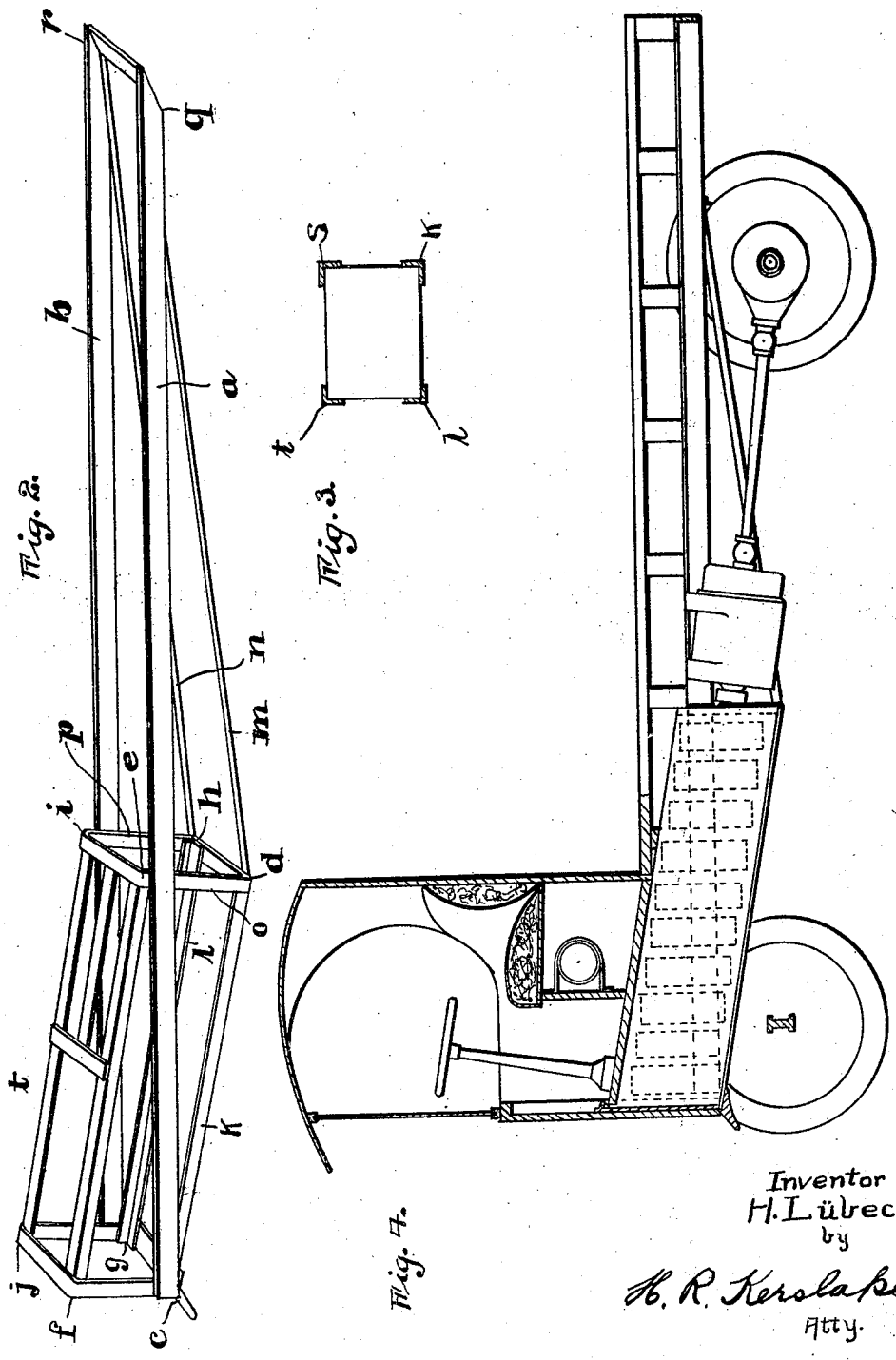

HILDING LÜBECK, OF HERSERUD, SWEDEN.

ELECTRIC MOTOR CAR.

1,414,292.   Specification of Letters Patent.   Patented Apr. 25, 1922.

Application filed December 28, 1918. Serial No. 268,711.

*To all whom it may concern:*

Be it known that I, HILDING LÜBECK, engineer, subject of the King of Sweden, residing at Herserud, Sweden, have invented certain new and useful Improvements in Electric Motor Cars, of which the following is a specification.

Owing to the large space occupied by the storage battery in electric motor cars it has long been connected with difficulties to find a suitable place for same. The result has been that manufacturers often divide the battery, which arrangement however is not practical from the point of view of rapid exchange of the battery. To facilitate such exchange, the whole battery ought to be arranged in one place on the motor car. By arrangements hitherto known, fulfilling this condition, the motor car has obtained an ungainly appearance or the design has resulted in other disadvantages.

The invention has particularly for its object to provide a suitable place for the battery, which place at the same time facilitates the designing and the building of the body of the car in full analogy with that of other modern motor driven vehicles, such as gasolene-driven cars, the characterizing feature of which consists in the driver's seat being located relatively low behind the front wheels and in a bonnet or hood being provided in front of the driver's seat above the front wheels.

According to the present invention the battery is placed in the front part of the motor car in a horizontal or inclined position in such a manner, that the battery occupies, in addition to the foremost space beneath the bonnet, corresponding to the place occupied by the engine in an ordinary petrol car, also wholly or partly the space beneath the floor of the driver's place and contingently also beneath the driver's seat. If necessary, the battery room may extend also somewhat behind the driver's seat. Preferably the battery is arranged in a somewhat inclined position, the foremost end with enough clearance above the front axle, but it may also be placed in horizontal position. In the latter case, however, inconveniences arise which are due, either, in case the battery is placed at a low level, to the lower side of the battery being located too close to the front axle or, if the battery is placed at a higher level, to the driver's seat being located too high, whereby the motor car will obtain a less attractive appearance. By taking a middle course it is, however, also possible to place the battery horizontally, which arrangement may be adopted with advantage for instance for large trucks.

Owing to the inclined position of the battery the surface of the liquid in the cells of the battery will evidently take an oblique position relatively to the sides of the cells. If the space above the electrodes in the cells is large enough, this will not cause any inconvenience. It is, however, also possible to use cells of special design or ordinary cells may be arranged vertically and stepwise in the battery box.

In the proposed position of the battery this is easily accessible for inspection and cleaning from shutters provided in the bonnet and in the floor of the driver's place.

The exchange of the battery is intended to be effected from the front of the car, which is the method to be preferred to others. Especially in case of a greater number of motor cars having to exchange their batteries simultaneously, the exchange may be effected very comfortably for instance from a platform, to which the motor cars drive up side by side.

In the position described the battery is well protected. When the exchange of the battery is effected from the front of the car, the lower part of the battery room may be entirely closed so that moisture and dirt can not enter as when the battery is placed beneath the frame with shutters on both sides for the exchange. Further, even the lowermost part of the battery is, in the position proposed, located considerably higher than is generally the case when placing the battery below the frame.

Although this arrangement makes the cars somewhat longer than such electric motor cars need to be which have the battery placed below the frame, they are, however, not longer than is usual for petrol cars.

The arrangement of the battery as proposed, preferably in an inclined position, has the further advantage that the shape of the motor car in this way may be designed in accordance with the common shape of petrol cars, which is now universally considered to be the most suitable one for a motordriven vehicle.

The invention is illustrated on the accompanying drawing in which Fig. 1 shows an electric motor car with a battery arrangement according to the invention, seen from the side and partly in section. Fig. 2 shows the frame or chassis of the car in a perspective view and Fig. 3 a section through the front part of the frame showing the location of the battery box, and Figure 4 is a longitudinal section of an electric motor car showing the stepwise arrangement of the battery cells.

The battery box is carried by a framework of an approximal parallel pipedical form arranged in the front part of the car between the two main frame members a and b Fig. 2 carried by the front and rear wheels. Said framework consists suitably of angle irons connected together in the corners c, d, e, f, g, h, i, j, and is fastened to the two main frame members a and b in such a manner that the lower longitudinal side bars k and l of the framework and stays m and n preferably extending from the lowermost corners d and h and connected at their opposite ends to the main frame members a and b for instance at the rear ends q and r of the latter, together with said main frame members form two triangles cdq and ghr in which the rear upright side bars o and p of the framework which are fastened to the main frame members a and b at the corners e and i, form transverse stays or struts.

The two triangular parts of the frame are preferably kept together by means of the cross bars cg, dh, ei and fj forming part of the framework of the battery and, if necessary, also by means of other connecting bars required.

The two upper longitudinal side bars s and t may preferably serve as a fixture for the electric motor u as also for a steering device v and for the floor or the battery shutters under the driver's place.

The motor is placed with its shaft in the longitudinal direction of the motor car for instance below the driver's seat and is preferably carried by the same frame construction that carries the battery. The motor should preferably be rigidly connected with the frame, but may also be hinged to the frame, particularly in light cars.

By arranging the motor in this position it is made possible to use common single spur gears x, y. The power is transmitted from these gears to a propeller shaft z and from this preferably through bevel gears in connection with the rear axle or in any other suitable way to the wheels.

By an arrangement according to the invention, contrary to most other designs of electric trucks, also the adavantage is gained, that all easily damaged parts, such as the battery, the motor, the electric wiring, the controller and so on, are entirely separated from the loading platform. In this way the design in this respect becomes quite equal to that of the petrol cars.

I claim :—

1. In electric motor cars, the arrangement of the battery compartment in a longitudinally-inclined position at the front part of the car, the rear end of said compartment being substantially lower than the fore end.

2. In electric motor cars, a battery compartment located at the front part of the car and extending rearwardly in a longitudinally-inclined position under the bottom of the driver's compartment, said battery compartment being adapted to receive the complete battery required to drive the car, said complete battery being removable from the front end of the car.

3. An arrangement of the type set forth in claim 1, in which the battery compartment extends from the forward end of the car, as a continuous compartment, rearwardly beneath the floor of the driver's compartment.

4. In electric motor cars, the arrangement of the battery compartment in a longitudinally-inclined position at the front part of the motor car, said compartment, as a continuous compartment, occupying the space corresponding to the location of the engine in an ordinary gasolene-driven car, and, in addition thereto, extending rearwardly beneath the floor of the driver's compartment.

5. In electric motor cars, the arrangement of the battery in a longitudinally-inclined position at the front part of the car, the cells of such battery standing in a substantially vertical position, and being arranged stepwise at different levels.

6. In electric motor cars, a battery compartment arranged in a longitudinally-inclined position at the front part of the car, and an auxiliary frame work for said battery compartment, placed between two longitudinal main frame members and comprising two longitudinal bars fixed to said members and extending rearwardly in an inclined position, two upright stays connecting the rear ends of the said longitudinal bars with said members, and two truss rods extending from the lower part of said frame work to the main frame members at a point in the rear of said upright stays.

7. In electric motor cars, a compartment arranged in a longitudinally inclined position at the front part of the motor car, and a motor placed above the rear end of said compartment and located substantially above the main frame members of the car, the shaft of said motor extending longitudinally of the car.

8. In electric motor cars, main frame members extending lengthwise of the car, an auxiliary frame at the forward end of the car for receiving a battery in a longitudinally inclined position, and a motor located above the rear end of said auxiliary frame and also substantially above the main frame members.

9. In electric motor cars, main frame members extending lengthwise of the car, an auxiliary frame at the forward end of the car, a battery supported by said auxiliary frame in a longitudinally inclined position and extending from the forward end of the car rearward beneath the driver's seat, and a motor located above the rear end of the auxiliary frame and also substantially above the main frame members.

10. In electric motor cars, main frame members extending lengthwise of the car, an auxiliary frame at the forward end of the car for receiving a battery, a motor supported on said auxiliary frame and located above the same and also substantially above the main frame members, the shaft of said motor extending in the longitudinal direction of the motor car, and gears located adjacent to said motor for transmitting the motion of said motor shaft to a propeller shaft, said propeller shaft being operatively connected with the rear wheels of the car.

11. In electric motor cars, a battery compartment extending longitudinally of the car and inclined upwardly from its rear end to its forward end, the front portion of said compartment extending above the front axle and forwardly beyond the centers of the front wheels, to adapt the battery to be removed from the car at a point located forwardly of the front axle.

In testimony whereof I affix my signature in presence of two witnesses.

HILDING LÜBECK.

Witnesses:
 ALBERT E. PARKER,
 HELEN LORIA.